June 10, 1947. H. P. TAYLOR 2,421,815
FEEDER FOR VINERS
Filed March 27, 1945 3 Sheets-Sheet 3
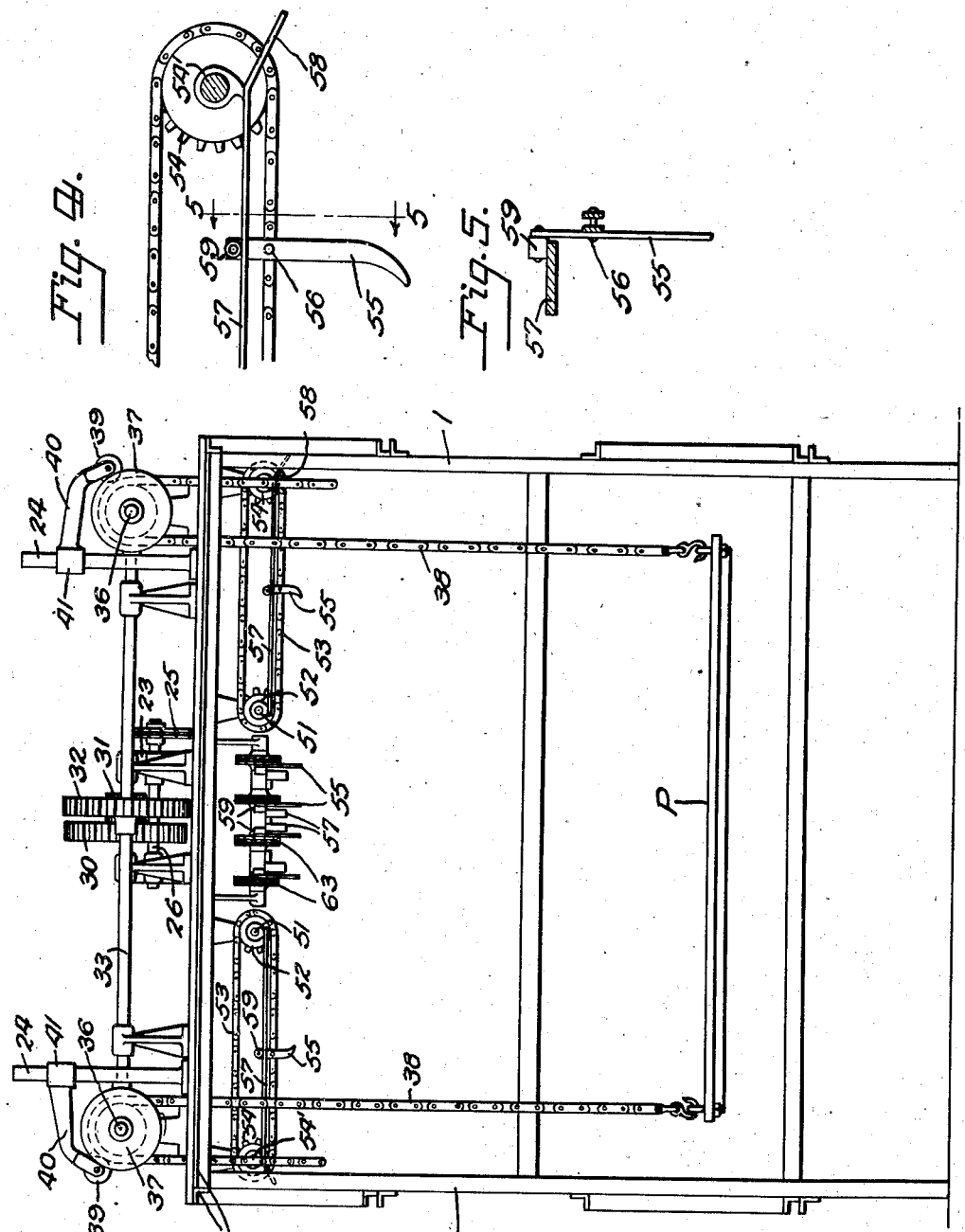
Inventor
H.P. Taylor
By Mason Fenwick & Lawrence
Attorneys Patented June 10, 1947

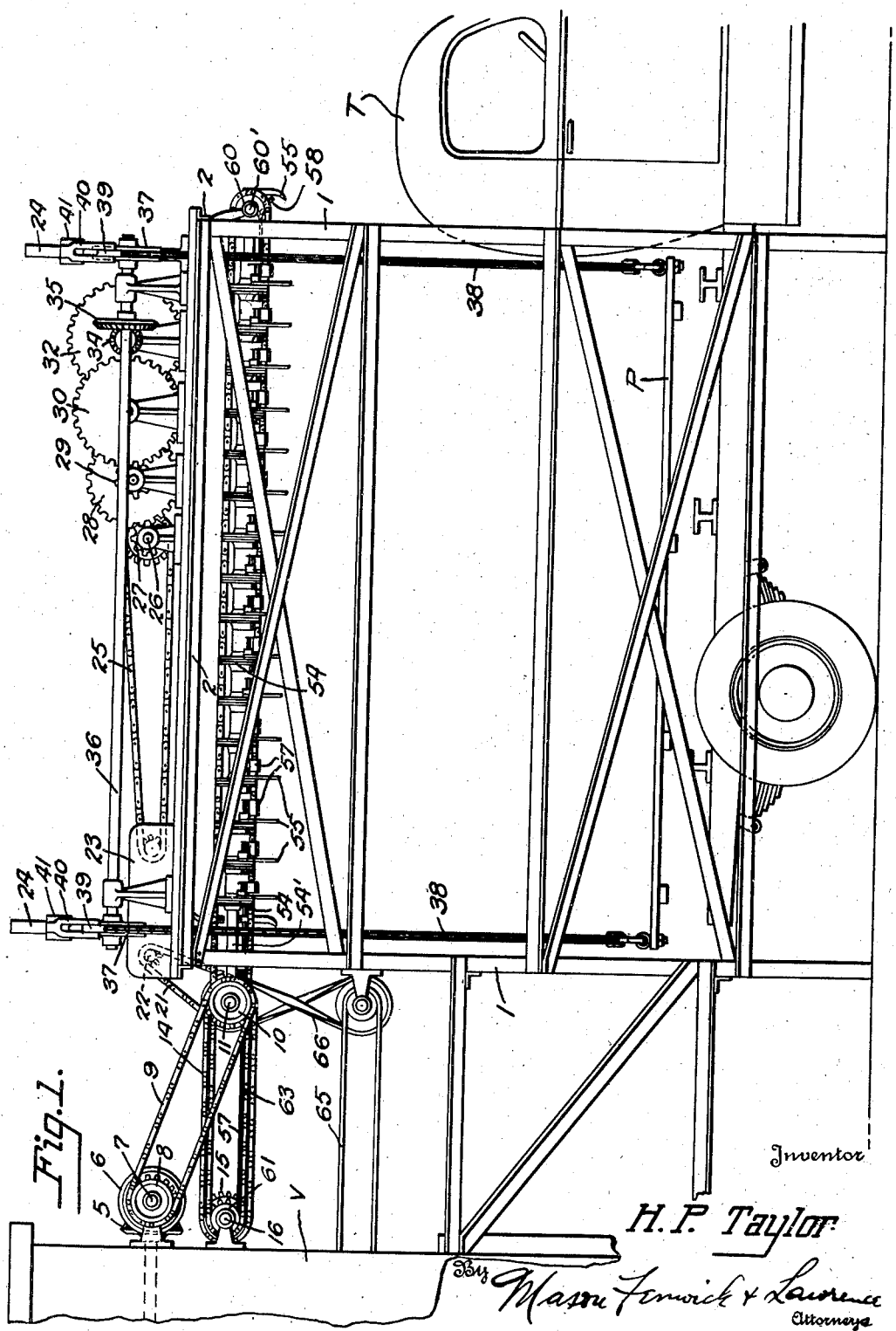

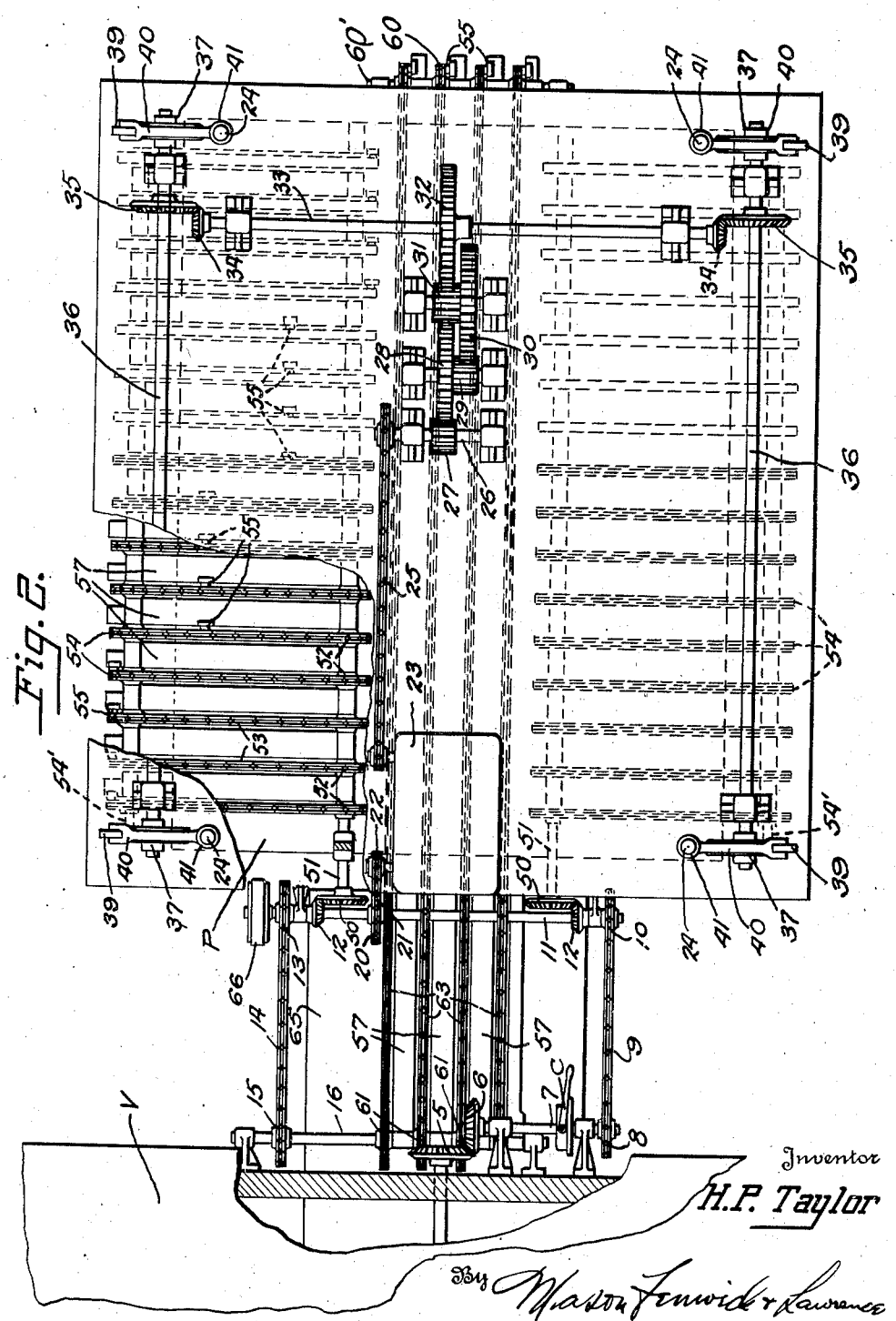

2,421,815

UNITED STATES PATENT OFFICE 2,421,815

FEEDER FOR VINERS

Henry Porterfield Taylor, Walkerton, Va.

Application March 27, 1945, Serial No. 585,209

1 Claim. (Cl. 214—44)

This invention is directed toward providing an automatic feeder for viners which are machines now commonly used in the canning industry for handling vines such as green peas and Lima beans and similar vegetables. The present practice is to harvest the vines with the pods in place and the viner separates the peas or beans from the pods and vines.

The vines are usually windrowed and loaded upon wagons or motor trucks in the field and thence conveyed to the viner which is ordinarily housed in a suitable structure and the vines fed by laborers with pitchforks from the truck to the viner feeder. The usual practice requires two men for this operation—one stationed adjacent the viner feeder and the other on the truck passing pitchforks of vines to the first man. This process is not only expensive in labor costs but is very hard work and requires constant attention by the laborers involved, as the vines must be fed to the feeder with regularity to prevent underfeeding, in which case the viner is not utilized to its capacity, or overfeeding, which is usually accompanied by a breakdown of the viner machinery. The present invention proposes to provide an automatic feeder by means of which the vines are fed into the viner at a uniform rate and contemplates a construction by means of which trucks are released for further use while their loads are being fed into the viner. It thus contemplates not only reducing the labor costs of the normal feeding of the vines to the viner but much greater efficiency in the use of the farm wagons or trucks.

The general object of the invention is, as indicated, the provision of an automatic feeder for a viner machine.

The invention consists in the novel construction, arrangement and combinations of parts hereinafter more particularly described and claimed.

Three sheets of drawings accompany this specification as part thereof, in which like reference characters indicate like parts throughout.

Referring to the drawings:

Figure 1 is a side elevation of the improved feeder showing a truck backed in position for unloading and with its loading platform just released from the chassis;

Figure 2 is a plan view of the feeder, parts being broken away;

Figure 3 is a front end elevation of the feeder;

Figure 4 is a fragmentary detailed illustration of a rake finger as associated with any of the feeding chains; and, Figure 5 is a sectional view taken on the line 5—5 of Figure 4.

In the drawings accompanying this specification, V represents the building structure housing the viner machinery. The truck used to convey the vines from the fields to the viner is identified by T, and removable loading platform for the truck T is identified by P. This truck platform will be of rectangular shape and may be removably secured to the chassis of the truck T in any known and desirable manner.

The feeder mechanism which constitutes the present invention includes generally a framework supported by vertical pedestals 1 at a height to locate the feeding chains slightly above the average load of vines carried by a truck. The vertical pedestals 1 are spaced apart sufficiently to permit a loaded truck T to be backed between such posts to position the load intermediate said posts both longitudinally and transversely and below the vine raking mechanism hereinafter to be described.

This vine raking mechanism is carried by a platform P supported at the tops of the pedestals 1 upon longitudinal and transverse angle members 2 with such additional bracing members as may be necessary to give suitable rigidity being added to the frame structure.

In viners now on the market, a central heavy shaft extends down the center of the machine and is known as the beater shaft, and such feeding devices as are now known are ordinarily operated by such beater shaft, and this practice is contemplated in connection with the present invention. The viner beater shaft is provided on its end with a beveled gear 5 which engages a bevel gear 6 fixedly secured to a short shaft 7 suitably journaled on the viner structure housing, the shaft 7 carrying a sprocket 8 connected as by chain 9 to a sprocket 10 fixed with respect to a shaft 11 journaled on the vertical pedestals 1 of the vine feeder and extending transversely of the feeder at its left end. On this shaft 11 are fixedly secured two oppositely disposed beveled gears 12—12 and a sprocket 13, which sprocket 13 is connected as by a chain 14 with a sprocket 15 secured to a shaft 16 which is also journaled on the viner structure and which carries a plurality of sprockets 61 rigidly secured thereto in spaced relationship adjacent the center of the feeder.

Adjacent each corner of the feeder framework are positioned chain wheels 37, these wheels on each side being mounted on longitudinally extending shafts 36 to each of which is secured a beveled gear 35, these beveled gears on opposite sides of the feeder being engaged by beveled gears 34—34 carried on the opposite ends of a transverse shaft 33 carrying a driving gear 32 forming one of a train of gears 27, 28, 29, 30, 31 and 32 for reducing the speed of rotation to be transmitted to the chain wheels 37. Gear 27 of this chain of gears is mounted on a transverse shaft 26 upon which is also fixedly mounted a sprocket for a chain drive 25 by means of which power is transmitted from a variable speed control box of suitable and known form herein illustrated represented diagrammatically at 23. The other reduction gears 28, 29, 30, and 31 are mounted on transverse shafts suitably journaled on the platform 3.

Power is transmitted to the speed control box 23 through sprocket 22, chain 21 and sprocket 20 fixedly mounted on shaft 11. Around each of the chain wheels 37 are chains 38, the lower ends of which are adapted to be removably engaged with the corners of the loading platform P. Such chains are held in positive engagement with the chain wheel 37 as by rollers 39 mounted on brackets 40 provided with sleeve portions 41 slidable upon the upper ends of vertical posts 24 fixed to the platform 3 adjacent the chain wheels 37.

The vine feeding mechanism proper consists of a plurality of endless chains arranged in three groups. Two of these groups which are substantially identical in number and arrangement are positioned on each side, the chains 53 extending in substantially a common plane transversely of the feeder being mounted on a plurality of sprockets 52 secured on longitudinally extending shafts 51—51 having on their rear ends beveled gear 50—50 adapted to engage beveled gears 12—12 secured on shaft 11. The outer ends of the chains are mounted upon idling sprockets 54 which are in turn mounted upon longitudinally extending shafts 54'—54'. By reason of this arrangement it will be observed that the lower reaches of all of the transverse chains 53 move inwardly toward the center of the framework, and it will further be observed that the inner driving shafts 51—51 of these transverse chains are spaced apart with respect to the longitudinal center of the framework.

Extending longitudinally of the framework and between the inner ends of the transverse chains 53 are a plurality of longitudinally extending endless chains 63 which pass at their rear over the sprockets 61 mounted on shaft 16 which is mounted on the viner and at their forward end over a plurality of sprockets 60 which are freely rotatable on a short transverse shaft 60'.

On each of these feeding chains, both longitudinal and transverse, are secured a suitable number of raking fingers 55 illustrated in detail in Figures 4 and 5, each of the fingers 55 being pivoted with respect to the chains 53 (or 63) as by a chain pivot 56, and having on its upper end a roller 59. Mounted above the bottom reach of each of the feeder chains 53 or 63 is a rake finger control strip 57 adapted to engage the rollers 59 of the rake fingers 55 and thus maintain the rake fingers 55 in a fixed downwardly directed position throughout the extent of such control strips 57. For convenience the forward or approach ends of these finger strips will be slightly deflected as at 58 to assure engagement of the rollers 59 with said strips as is illustrated in Figures 1, 3 and 4.

As herein illustrated there are four of the longitudinally extending chains 63 and each of these chains is provided with three equally spaced raking fingers 55. Each of the transverse chains 53 will be provided with two of the raking fingers 55 spaced equally apart on each chain and these raking fingers on the transverse chains are preferably staggered, the chains 53 on each side being arranged in groups with the fingers on each group of chains similarly positioned, but the fingers as positioned on one group staggered with respect to the fingers on the adjacent groups by which means the transverse chains most remote from the viner will first discharge to the center and successive groups will successively discharge as the fingers of the longitudinal chains approach the viner.

By means of the variable speed control box 23, the speed of operation of the feeder may be controlled to suit the type and condition of vines being handled and the capacity of the viner. It will also permit the rapid adjustment of the platform to the feeding chains where less than a capacity load is being handled.

With the mechanism as herein described and illustrated the operation is briefly as follows:

The loaded truck T is backed between the vertical standards 1 until the load is positioned under the raking chains 53 and 63.

The load lifting chains 38 are then engaged to the four corners of the load platform P, which load platform is released from the chassis of the truck T. Thereupon, clutch C is thrown and power transmitted from the viner through gear 5 to transmit power to shaft 11, from which shaft it will be noted rotation is transmitted through gears 12—50 to all of the transverse feeding chains 53, while through sprocket 13, chain 14 and sprocket 15, power is transmitted to shaft 16 and sprockets 61 to all of the longitudinal feeding chains 63. At the same time, sprocket 20 mounted on shaft 11 transmits power through chain 21, speed control box 23, chain 25 and reduction gears 27, 28, 29, 30, 31 and 32 to transverse shaft 33 and through bevel gears 34—35 to chain wheels 37, thus commencing the lifting of chains 38 and platform P.

All of the gearing will be proportioned suitably to lift the loaded platform P progressively while the transversely positioned feeding chains 53 with their associated hook fingers 55 will feed the vines on the platforms from the outer longitudinal sides of the load toward the longitudinal center of the load, while at the same time the longitudinally disposed feed chains 61 will operate to engage the load adjacent the longitudinal center and carry the same rearwardly, depositing same in a conveyor 65 driven by belt 66 from the shaft 11, whereupon the vines are carried to the viner machine. In this connection the length of the hook or rake fingers, which are relatively long will determine the working space between the conveyor chains and the top surface of the load, which space must be sufficient to permit the bundling of the vines as they advance. Thus the actual cut of the fingers into the load will be substantially less than this working space. As soon as the loaded platform P has been lifted sufficiently to disengage truck T it will be observed that truck T can be moved forward and an additional platform P positioned on its chassis which permits the return of the truck to the field for another load while the load on the original platform P is being automatically fed to the viner by the mechanism as previously described.

Various modifications in the construction of the framework and the driving mechanism will readily suggest themselves to those skilled in the art but all within the scope of the present invention as claimed.

Having thus described my invention, I claim:

Feeding device for viner comprising a rectangular frame, standards supporting the frame so spaced and positioned as to permit a loaded truck to pass under the frame, a platform adapted to form the removable load platform for a truck, a plurality of endless chains arranged in two series, one on each side of the frame, all of said chains arranged parallel and in a substantially common plane, the inner ends of the chains of the two series spaced apart from the longitudinal center of the platform, other endless chains operating longitudinally of the platform, between the two series and in substantially the same horizontal plane, teeth spaced and pivoted on all said chains, the chains comprising the two transverse series arranged in similar groups and the teeth of each group of each series staggered with respect to the teeth of the next adjacent group of that series and so positioned with respect to the teeth on the longitudinally extending chains that the teeth on the transverse chains most remote from the viner will reach the center chains as teeth on the latter assume operative raking position and successive groups of transverse chains will successively discharge to the center chains as their raking teeth progress toward the viner, means for maintaining the teeth on all of the chains deflected from the bottom reaches of said chains, flexible members for elevating the platform from a truck chassis toward the frame, means for operating the chains of the two series to advance their bottom reaches toward the center, means for operating the longitudinal chains to advance their bottom reaches over one end of the platform and means for operating the flexible platform supporting members to lift in predetermined ratio with the operation of said endless chains.

HENRY PORTERFIELD TAYLOR.

REFERENCES CITED

The following references are of record in the file of this patent:

UNITED STATES PATENTS

| Number | Name | Date |
| --- | --- | --- |
| 365,528 | Long | June 28, 1887 |
| 1,332,292 | Gregg | Mar. 2, 1920 |
| 1,490,595 | DeLateur | Apr. 15, 1924 |
| 1,510,530 | White et al. | Oct. 7, 1924 |
| 2,187,026 | Hamachek, Jr. | Jan. 16, 1940 |

FOREIGN PATENTS

| Number | Country | Date |
| --- | --- | --- |
| 594,037 | Germany | Mar. 12, 1934 |